(12) United States Patent
Menczykalski et al.

(10) Patent No.: US 11,131,214 B2
(45) Date of Patent: Sep. 28, 2021

(54) GAS TURBINE ENGINE

(71) Applicants: Rolls-Royce Deutschland Ltd & Co KG, Blankenfelde-Mahlow (DE); Rolls-Royce plc, London (GB)

(72) Inventors: Stefan Menczykalski, Berlin (DE); Stephan Uhkoetter, Berlin (DE); John R. Mason, Bristol (GB); David A. Edwards, Derby (GB); Neil Davies, Ashbourne (GB); Lynn Hammond, Cheltenham (GB); David Williams, Bristol (GB)

(73) Assignees: ROLLS-ROYCE DEUTSCHLAND LTD & CO KG, Blankenfelde-Mahlow (DE); ROLLS-ROYCE PLC, London (GB)

( * ) Notice: Subject to any disclaimer, the term of this patent is extended or adjusted under 35 U.S.C. 154(b) by 100 days.

(21) Appl. No.: 16/382,923

(22) Filed: Apr. 12, 2019

(65) Prior Publication Data
US 2019/0316488 A1 Oct. 17, 2019

(30) Foreign Application Priority Data
Apr. 17, 2018 (DE) .......................... 102018109100.1

(51) Int. Cl.
*F01D 25/20* (2006.01)
*F02C 7/14* (2006.01)
(Continued)

(52) U.S. Cl.
CPC ................ *F01D 25/20* (2013.01); *F02C 7/06* (2013.01); *F02C 7/14* (2013.01); *F02C 7/36* (2013.01)

(58) Field of Classification Search
CPC .......... F01D 25/18; F01D 25/20; F01D 15/12; F05D 2260/98; F05D 2260/40311;
(Continued)

(56) References Cited

U.S. PATENT DOCUMENTS 8,230,974 B2 7/2012 Parnin
8,307,626 B2 11/2012 Sheridan
(Continued)

FOREIGN PATENT DOCUMENTS

EP 2224120 A2 9/2010
EP 3102807 A2 12/2016
(Continued)

OTHER PUBLICATIONS

German Search Report dated Jan. 7, 2019 for counterpart German Patent Application No. DE 10 2018 109 100.1.
(Continued)

*Primary Examiner* — Ehud Gartenberg
*Assistant Examiner* — Roberto Toshiharu Igue
(74) *Attorney, Agent, or Firm* — Shuttleworth & Ingersoll, PLC; Timothy J. Klima

(57) ABSTRACT

A gas turbine engine includes a gearbox receiving input from a core shaft and driving a fan at a lower speed than the core shaft. First and second oil circuits fluidly couple with an inlet and outlet of the gearbox. A third oil circuit fluidly couples with an inlet and outlet of the gearbox. The outlet of the gearbox includes a device directing oil from the gearbox to the first oil circuit, to the second oil circuit and to the third oil circuit when feeding to the gearbox exceeds a predefined oil flow rate, or deviates an operational value corresponding with that oil flow rate, and directs oil from the gearbox to the third oil circuit when feeding to the gearbox is ≤ the
(Continued)

predefined flow rate or is ≤ a corresponding operational value or is greater than or equal to a further corresponding operational value.

15 Claims, 5 Drawing Sheets

(51) Int. Cl.
    *F02C 7/36*     (2006.01)
    *F02C 7/06*     (2006.01)

(58) Field of Classification Search
    CPC ............ F16H 2061/0037; F16H 48/00; F16H 57/0434; F16H 57/0413; F16N 2210/02; F16N 2210/08; F16N 2210/09; F02C 7/06; F02C 7/14; F02C 7/36; F01M 1/02; F01M 1/12; F02K 3/06
See application file for complete search history.

(56) References Cited

U.S. PATENT DOCUMENTS

| | | | |
|---|---|---|---|
| 8,484,942 B1 | 7/2013 | McCune et al. | |
| 9,410,448 B2 | 8/2016 | Sheridan et al. | |
| 9,909,453 B2 | 3/2018 | Fang et al. | |
| 10,107,142 B2 | 10/2018 | Mastro et al. | |
| 2013/0319006 A1 | 12/2013 | Parnin et al. | |
| 2014/0124297 A1 | 5/2014 | Motto | |
| 2015/0361888 A1* | 12/2015 | Roberge | F02C 3/107 415/1 |
| 2016/0032773 A1* | 2/2016 | James | F01D 25/20 416/170 R |
| 2017/0114784 A1* | 4/2017 | Parnin | F04B 51/00 |
| 2017/0175874 A1* | 6/2017 | Schwarz | F01D 21/00 |
| 2018/0073395 A1 | 3/2018 | Parnin et al. | |
| 2018/0163566 A1 | 6/2018 | Fang et al. | |
| 2019/0323597 A1 | 10/2019 | Sheridan | |

FOREIGN PATENT DOCUMENTS

| | | | |
|---|---|---|---|
| EP | 3159500 A1 | 4/2017 | |
| EP | 3163049 A2 | 5/2017 | |
| EP | 3293363 A2 * | 3/2018 | ............ F01D 25/20 |
| WO | 2014133836 A1 | 9/2014 | |
| WO | 2014152347 A2 | 9/2014 | |
| WO | 2015047514 A2 | 4/2015 | |
| WO | 2015047515 A2 | 4/2015 | |

OTHER PUBLICATIONS

European Search Report dated Sep. 20, 2019 for counterpart European Patent Application No. EP 19166136.2.
Menczykalski, Stefan et al.—U.S. Appl. No. 16/382,832, filed Apr. 12, 2019.
Uhkoetter, Stephan et al.—U.S. Appl. No. 16/539,412, filed Aug. 13, 2019.
German Search Report dated May 3, 2019 from related German Patent Application No. DE102018120511.2.
German Search Report dated Dec. 18, 2018 from related German Patent Application No. DE102018109108.7.
European Search Report dated Aug. 27, 2019 from related European Patent Application No. 19166159.4.

* cited by examiner

GAS TURBINE ENGINE

This application claims priority to German Patent Application DE102018109100.1 filed Apr. 17, 2018, the entirety of which is incorporated by reference herein.

The present disclosure relates to a gas turbine engine comprising an engine core including at least one turbine, at least one compressor, and at least one shaft connecting the turbine to the compressor. A fan is located upstream of the engine core. The fan comprises a plurality of fan blades. A gearbox of the gas turbine engine receives an input from the shaft and outputs drive to the fan so as to drive the fan at a lower rotational speed than the core shaft.

A typical gas turbine engine includes a fan section, a compressor section, a combustor section and a turbine section. Air entering the compressor section is compressed and delivered into the combustion section where it is mixed with fuel and ignited to generate a high-speed exhaust gas flow. The high-speed exhaust gas flow expands through the turbine section to drive the compressor and the fan section. The compressor section typically includes low and high pressure compressors, and the turbine section includes low and high pressure turbines.

Existing turbofan solutions for aircrafts operate an oil system with a single oil circuit and do not incorporate a gearbox to drive the fan section such that the fan section may rotate at a speed different than the turbine section so as to increase the overall propulsive efficiency of the engine. This single oil circuit feeds and scavenges oil to all users in the engine at all operating conditions. The pilot of an aircraft is provided with an indication if the system is not operating as required, so that he can take appropriate action. The unacceptable oil system performance can be caused in a number of ways including oil leaks, pump failure, low oil quantities etc. It is standard practice to account for a delay between any flight deck indication and action from the pilot. This may be as long as 5 minutes, particularly if the indication is muted for some flight conditions.

In engine architectures incorporating such a gearbox, a shaft driven by one of the turbine sections provides an input to the epicyclical gear assembly that drives the fan section at a reduced speed such that both the turbine section and the fan section can rotate at closer to optimal speeds. The gear assembly requires lubrication to prevent premature wear of bearing surfaces. Accordingly, a lubrication system that includes a main pump or pumps, two oil circuits for the gearbox and a main reservoir is used during engine operation. However, when the engine is not operating, airflow through the fan may cause the gear assembly to rotate. Also, certain manoeuvres with the engine operating may briefly interrupt the operation of the main system. The system is therefore configured to ensure that oil is supplied to these gearbox bearings under all conditions in which lubrication and cooling is required including under failure conditions of the main oil delivery system.

Such a gearbox incorporates journal bearings that require a constant feed of oil to operate. There may be capability for a few seconds but it is unrealistic to expect this to increase to 5 minutes at power or extended periods (hours) at windmill conditions. Failure to provide sufficient oil in the right condition may lead to gearbox failure or seizure which may result in a locked fan. If the fan is unable to rotate, this is likely to constitute a hazardous condition to the aircraft. However, even if the fan does not lock there will be damage to the bearings which will then need replacing.

It is undesirable to incorporate an automated control system that reacts to indications of a reduction in oil flow to the bearings. Complex combinations of parameter may be required to ensure the resulting system is not susceptible to spurious activation and an uncommanded reduction in thrust. Such a system would require appropriate testing to meet the certification requirements. Notwithstanding appropriate flight clearance, aircraft manufacturers view automated systems unfavourable. This is due to a perception of increased in service disruptions from spurious activation and creates a competitive disadvantage.

It is the object of the present disclosure to provide a gas turbine engine of the kind as it is mentioned above, in which an oil supply for gearbox bearings is secured.

This object is achieved through a gas turbine engine with the features as disclosed herein.

As noted elsewhere herein, the present disclosure relates to a gas turbine engine. Such a gas turbine engine may include an engine core comprising a turbine, a combustor, a compressor, and a core shaft connecting the turbine to the compressor. Such a gas turbine engine may comprise a fan (having fan blades) located upstream of the engine core. The gas turbine engine comprises a gearbox that receives an input from the core shaft and outputs drive to the fan so as to drive the fan at a lower rotational speed than the core shaft. The input to the gearbox may be directly from the core shaft, or indirectly from the core shaft, for example via a spur shaft and/or gear or from a separate turbine. The core shaft may rigidly connect the turbine and the compressor, such that the turbine and compressor rotate at the same speed (with the fan rotating at a lower speed).

The gas turbine engine comprises a first oil circuit, a second oil circuit and at least a third oil circuit. The first oil circuit, the second oil circuit and the third oil circuit may fluidly be coupled with at least one inlet of the gearbox as well as with at least one outlet of the gearbox. The first oil circuit and the second oil circuit each may include at least one pump driven by the shaft. The third oil circuit may include at least one pump.

The outlet of the gearbox may include a device configured to direct oil from the gearbox to the first oil circuit and/or to the second oil circuit and/or to the third oil circuit during a normal operation mode when the feeding to the gearbox is exceeding a predefined oil flow rate, or is deviating an operational value corresponding with that oil flow rate, and is configured to direct the oil from the gearbox to the third oil circuit during an emergency operation mode when the feeding to the gearbox is less than or equal to the predefined flow rate or is less than or equal to at least one corresponding operational value or is greater than or equal to at least one further corresponding operational value.

Suitable corresponding operational values are for example a feeding pressure of the oil to the gearbox or the oil temperature.

In the disclosed gas turbine engine three or more oil circuits are incorporated within the engine. The oil circuits are configured to receive oil from the gearbox or a separate oil reservoir and to direct the received oil back into the gearbox. Cross feeding and scavenging are utilized to protect journal bearings of the gearbox during the period of low oil pressure until pilot action to reduce power.

The gas turbine engine as described and claimed herein may have any suitable general architecture. For example, the gas turbine engine may have any desired number of shafts that connect turbines and compressors, for example one, two or three shafts. Purely by way of example, the turbine connected to the core shaft may be a first turbine, the compressor connected to the core shaft may be a first compressor, and the core shaft may be a first core shaft. The engine core may further comprise a second turbine, a second compressor, and a second core shaft connecting the second turbine to the second compressor. The second turbine, second compressor, and second core shaft may be arranged to rotate at a higher rotational speed than the first core shaft.

In such an arrangement, the second compressor may be positioned axially downstream of the first compressor. The second compressor may be arranged to receive (for example directly receive, for example via a generally annular duct) flow from the first compressor.

The gearbox may be arranged to be driven by the core shaft that is configured to rotate (for example in use) at the lowest rotational speed (for example the first core shaft in the example above). For example, the gearbox may be arranged to be driven only by the core shaft that is configured to rotate (for example in use) at the lowest rotational speed (for example only be the first core shaft, and not the second core shaft, in the example above). Alternatively, the gearbox may be arranged to be driven by any one or more shafts, for example the first and/or second shafts in the example above.

In any gas turbine engine as described and claimed herein, a combustor may be provided axially downstream of the fan and compressor(s). For example, the combustor may be directly downstream of (for example at the exit of) the second compressor, where a second compressor is provided. By way of further example, the flow at the exit to the combustor may be provided to the inlet of the second turbine, where a second turbine is provided. The combustor may be provided upstream of the turbine(s).

The or each compressor (for example the first compressor and second compressor as described above) may comprise any number of stages, for example multiple stages. Each stage may comprise a row of rotor blades and a row of stator vanes, which may be variable stator vanes (in that their angle of incidence may be variable). The row of rotor blades and the row of stator vanes may be axially offset from each other.

The or each turbine (for example the first turbine and second turbine as described above) may comprise any number of stages, for example multiple stages. Each stage may comprise a row of rotor blades and a row of stator vanes. The row of rotor blades and the row of stator vanes may be axially offset from each other.

Each fan blade may be defined as having a radial span extending from a root (or hub) at a radially inner gas-washed location, or 0% span position, to a tip at a 100% span position. The ratio of the radius of the fan blade at the hub to the radius of the fan blade at the tip may be less than (or on the order of) any of: 0.4, 0.39, 0.38 0.37, 0.36, 0.35, 0.34, 0.33, 0.32, 0.31, 0.3, 0.29, 0.28, 0.27, 0.26, or 0.25. The ratio of the radius of the fan blade at the hub to the radius of the fan blade at the tip may be in an inclusive range bounded by any two of the values in the previous sentence (i.e. the values may form upper or lower bounds). These ratios may commonly be referred to as the hub-to-tip ratio. The radius at the hub and the radius at the tip may both be measured at the leading edge (or axially forwardmost) part of the blade. The hub-to-tip ratio refers, of course, to the gas-washed portion of the fan blade, i.e. the portion radially outside any platform.

The radius of the fan may be measured between the engine centreline and the tip of a fan blade at its leading edge. The fan diameter (which may simply be twice the radius of the fan) may be greater than (or on the order of) any of: 250 cm (around 100 inches), 260 cm, 270 cm (around 105 inches), 280 cm (around 110 inches), 290 cm (around 115 inches), 300 cm (around 120 inches), 310 cm, 320 cm (around 125 inches), 330 cm (around 130 inches), 340 cm (around 135 inches), 350 cm, 360 cm (around 140 inches), 370 cm (around 145 inches), 380 (around 150 inches) cm or 390 cm (around 155 inches). The fan diameter may be in an inclusive range bounded by any two of the values in the previous sentence (i.e. the values may form upper or lower bounds).

The rotational speed of the fan may vary in use. Generally, the rotational speed is lower for fans with a higher diameter. Purely by way of non-limitative example, the rotational speed of the fan at cruise conditions may be less than 2500 rpm, for example less than 2300 rpm. Purely by way of further non-limitative example, the rotational speed of the fan at cruise conditions for an engine having a fan diameter in the range of from 250 cm to 300 cm (for example 250 cm to 280 cm) may be in the range of from 1700 rpm to 2500 rpm, for example in the range of from 1800 rpm to 2300 rpm, for example in the range of from 1900 rpm to 2100 rpm. Purely by way of further non-limitative example, the rotational speed of the fan at cruise conditions for an engine having a fan diameter in the range of from 320 cm to 380 cm may be in the range of from 1200 rpm to 2000 rpm, for example in the range of from 1300 rpm to 1800 rpm, for example in the range of from 1400 rpm to 1600 rpm.

In use of the gas turbine engine, the fan (with associated fan blades) rotates about a rotational axis. This rotation results in the tip of the fan blade moving with a velocity $U_{tip}$. The work done by the fan blades 13 on the flow results in an enthalpy rise dH of the flow. A fan tip loading may be defined as $dH/U_{tip}^2$, where dH is the enthalpy rise (for example the 1-D average enthalpy rise) across the fan and $U_{tip}$ is the (translational) velocity of the fan tip, for example at the leading edge of the tip (which may be defined as fan tip radius at leading edge multiplied by angular speed). The fan tip loading at cruise conditions may be greater than (or on the order of) any of: 0.3, 0.31, 0.32, 0.33, 0.34, 0.35, 0.36, 0.37, 0.38, 0.39 or 0.4 (all units in this paragraph being $Jkg^{-1}K^{-1}/(ms^{-1})^2$). The fan tip loading may be in an inclusive range bounded by any two of the values in the previous sentence (i.e. the values may form upper or lower bounds).

Gas turbine engines in accordance with the present disclosure may have any desired bypass ratio, where the bypass ratio is defined as the ratio of the mass flow rate of the flow through the bypass duct to the mass flow rate of the flow through the core at cruise conditions. In some arrangements the bypass ratio may be greater than (or on the order of) any of the following: 10, 10.5, 11, 11.5, 12, 12.5, 13, 13.5, 14, 14.5, 15, 15.5, 16, 16.5, or 17. The bypass ratio may be in an inclusive range bounded by any two of the values in the previous sentence (i.e. the values may form upper or lower bounds). The bypass duct may be substantially annular. The bypass duct may be radially outside the core engine. The radially outer surface of the bypass duct may be defined by a nacelle and/or a fan case.

The overall pressure ratio of a gas turbine engine as described and/or claimed herein may be defined as the ratio of the stagnation pressure upstream of the fan to the stagnation pressure at the exit of the highest pressure compressor (before entry into the combustor). By way of non-limitative example, the overall pressure ratio of a gas turbine engine as described and/or claimed herein at cruise may be greater than (or on the order of) any of the following: 35, 40, 45, 50, 55, 60, 65, 70, 75. The overall pressure ratio may be in an inclusive range bounded by any two of the values in the previous sentence (i.e. the values may form upper or lower bounds).

Specific thrust of an engine may be defined as the net thrust of the engine divided by the total mass flow through the engine. At cruise conditions, the specific thrust of an engine described and/or claimed herein may be less than (or on the order of) any of the following: 110 Nkg-1s, 105 Nkg-1s, 100 Nkg-1s, 95 Nkg-1s, 90 Nkg-1s, 85 Nkg-1s or 80 Nkg-1s. The specific thrust may be in an inclusive range bounded by any two of the values in the previous sentence (i.e. the values may form upper or lower bounds). Such engines may be particularly efficient in comparison with conventional gas turbine engines.

A gas turbine engine as described and claimed herein may have any desired maximum thrust. Purely by way of non-limitative example, a gas turbine as described and/or claimed herein may be capable of producing a maximum thrust of at least (or on the order of) any of the following: 160 kN, 170 kN, 180 kN, 190 kN, 200 kN, 250 kN, 300 kN, 350 kN, 400 kN, 450 kN, 500 kN, or 550 kN. The maximum thrust may be in an inclusive range bounded by any two of the values in the previous sentence (i.e. the values may form upper or lower bounds). The thrust referred to above may be the maximum net thrust at standard atmospheric conditions at sea level plus 15° C. (ambient pressure 101.3 kPa, temperature 30° C.), with the engine static.

In use, the temperature of the flow at the entry to the high pressure turbine may be particularly high. This temperature, which may be referred to as TET, may be measured at the exit to the combustor, for example immediately upstream of the first turbine vane, which itself may be referred to as a nozzle guide vane. At cruise, the TET may be at least (or on the order of) any of the following: 1400K, 1450K, 1500K, 1550K, 1600K or 1650K. The TET at cruise may be in an inclusive range bounded by any two of the values in the previous sentence (i.e. the values may form upper or lower bounds). The maximum TET in use of the engine may be, for example, at least (or on the order of) any of the following: 1700K, 1750K, 1800K, 1850K, 1900K, 1950K or 2000K. The maximum TET may be in an inclusive range bounded by any two of the values in the previous sentence (i.e. the values may form upper or lower bounds). The maximum TET may occur, for example, at a high thrust condition, for example at a maximum take-off (MTO) condition.

A fan blade and/or aerofoil portion of a fan blade described herein may be manufactured from any suitable material or combination of materials. For example at least a part of the fan blade and/or aerofoil may be manufactured at least in part from a composite, for example a metal matrix composite and/or an organic matrix composite, such as carbon fibre. By way of further example at least a part of the fan blade and/or aerofoil may be manufactured at least in part from a metal, such as a titanium based metal or an aluminium based material (such as an aluminium-lithium alloy) or a steel based material. The fan blade may comprise at least two regions manufactured using different materials. For example, the fan blade may have a protective leading edge, which may be manufactured using a material that is better able to resist impact (for example from birds, ice or other material) than the rest of the blade. Such a leading edge may, for example, be manufactured using titanium or a titanium-based alloy. Thus, purely by way of example, the fan blade may have a carbon-fibre or aluminium based body (such as an aluminium lithium alloy) with a titanium leading edge.

A fan as described herein may comprise a central portion, from which the fan blades may extend, for example in a radial direction. The fan blades may be attached to the central portion in any desired manner. For example, each fan blade may comprise a fixture which may engage a corresponding slot in the hub (or disc). Purely by way of example, such a fixture may be in the form of a dovetail that may slot into and/or engage a corresponding slot in the hub/disc in order to fix the fan blade to the hub/disc. By way of further example, the fan blades maybe formed integrally with a central portion. Such an arrangement may be referred to as a blisk or a bling. Any suitable method may be used to manufacture such a blisk or bling. For example, at least a part of the fan blades may be machined from a block and/or at least part of the fan blades may be attached to the hub/disc by welding, such as linear friction welding.

The gas turbine engines described and claimed herein may or may not be provided with a variable area nozzle (VAN). Such a variable area nozzle may allow the exit area of the bypass duct to be varied in use. The general principles of the present disclosure may apply to engines with or without a VAN.

The fan of a gas turbine as described and claimed herein may have any desired number of fan blades, for example 16, 18, 20, or 22 fan blades.

As used herein, cruise conditions may mean cruise conditions of an aircraft to which the gas turbine engine is attached. Such cruise conditions may be conventionally defined as the conditions at mid-cruise, for example the conditions experienced by the aircraft and/or engine at the midpoint (in terms of time and/or distance) between top of climb and start of decent.

Purely by way of example, the forward speed at the cruise condition may be any point in the range of from Mach 0.7 to 0.9, for example 0.75 to 0.85, for example 0.76 to 0.84, for example 0.77 to 0.83, for example 0.78 to 0.82, for example 0.79 to 0.81, for example on the order of Mach 0.8, on the order of Mach 0.85 or in the range of from 0.8 to 0.85. Any single speed within these ranges may be the cruise condition. For some aircraft, the cruise conditions may be outside these ranges, for example below Mach 0.7 or above Mach 0.9.

Purely by way of example, the cruise conditions may correspond to standard atmospheric conditions at an altitude that is in the range of from 10000 m to 15000 m, for example in the range of from 10000 m to 12000 m, for example in the range of from 10400 m to 11600 m (around 38000 ft), for example in the range of from 10500 m to 11500 m, for example in the range of from 10600 m to 11400 m, for example in the range of from 10700 m (around 35000 ft) to 11300 m, for example in the range of from 10800 m to 11200 m, for example in the range of from 10900 m to 11100 m, for example on the order of 11000 m. The cruise conditions may correspond to standard atmospheric conditions at any given altitude in these ranges.

Purely by way of example, the cruise conditions may correspond to: a forward Mach number of 0.8; a pressure of 23000 Pa; and a temperature of −55° C.

As used anywhere herein, "cruise" or "cruise conditions" may mean the aerodynamic design point. Such an aerodynamic design point (ADP) may correspond to the conditions, for example, one or more of the Mach Number, environmental conditions and thrust requirement, for which the fan is designed to operate. This may mean, for example, the conditions at which the fan or gas turbine engine is designed to have optimum efficiency.

In use, a gas turbine engine described and claimed herein may operate at the cruise conditions defined elsewhere herein. Such cruise conditions may be determined by the cruise conditions, for example the mid-cruise conditions, of an aircraft to which at least one (for example 2 or 4) gas turbine engine may be mounted in order to provide propulsive thrust.

It would be appreciated that the first oil circuit is including a heat exchanger especially for cooling the oil and/or a filter and monitoring sensors.

The second oil circuit may include a heat exchanger especially for cooling the oil and/or a filter and monitoring sensors.

The first oil circuit, the second oil circuit and the third oil circuit may fluidly be coupled with a common inlet of the gearbox.

Moreover, the first oil circuit, the second oil circuit and the third oil circuit may fluidly be coupled with a common outlet of the gearbox.

In one embodiment of the gas turbine engine the first oil circuit, the second oil circuit and the third oil circuit each are fluidly coupled with a separate inlet of the gearbox.

In a further embodiment of the gas turbine engine the first oil circuit, the second oil circuit and the third oil circuit each are fluidly coupled with a separate outlet of the gearbox.

Furthermore, it is possible that the first oil circuit and the second oil circuit are fluidly coupled with a common inlet of the gearbox and the third oil circuit is fluidly coupled with a separate inlet of the gearbox.

It is also possible that the first oil circuit and the second oil circuit are fluidly coupled with a common outlet of the gearbox and the third oil circuit is fluidly coupled with a separate outlet of the gearbox.

The first oil circuit and the second oil circuit each may include a scavenge pump and a feeding pump driven by the first core shaft or by the second core shaft. These pumps may be individually driven or driven together.

The third oil circuit may include a feeding pump driven by the fan or by the second core shaft and a scavenge pump if required. These pumps also may be individually driven or driven together.

The heat exchanger of the first oil circuit may be arranged between the feeding pump and the inlet of the gearbox, between the outlet of the gearbox and the scavenge pump, between the scavenge pump and the inlet of a tank or between the outlet of the tank and the feeding pump for cooling oil in an appropriate manner.

Further, the filter and/or the monitoring sensors of the first oil circuit may be arranged between the feeding pump and the inlet of the gearbox, between the outlet of the gearbox and the scavenge pump, between the scavenge pump and the inlet of a tank, or between the outlet of the tank and the feeding pump.

The heat exchanger of the second oil circuit may be arranged between the feeding pump and the inlet of the gearbox, between the outlet of the gearbox and the scavenge pump, between the scavenge pump and the inlet of a tank or between the outlet of the tank and the feeding pump for cooling oil in an appropriate manner.

Moreover, the filter and/or the monitoring sensors of the second oil circuit may be arranged between the feeding pump and the inlet of the gearbox, between the outlet of the gearbox and the scavenge pump, between the scavenge pump and the inlet of a tank, or between the outlet of the tank and the feeding pump.

Ensuring the appropriate flows during normal operation of the gas turbine engine and isolating each system during failure cases could be achieved by either a valve arrangement or a splitter. The latter may use hardware design alone to divert the oil to each route. A valve solution can be achieved with pressure driven valves but commanded valves may be included, e.g. solenoid valves with an engine control input signal.

The device of the gas turbine engine may include an oil reservoir from which oil received from the gearbox can be directly conducted back into the gearbox via the third oil circuit, and into the gearbox via the first oil circuit and the second oil circuit. Oil will be conducted from the oil reservoir only via the third oil circuit directly to the inlet of the gearbox as long as a filling level of the oil reservoir is less than a defined filling level of the oil reservoir. And oil will be directed also or solely via the first oil circuit and via the second oil circuit to the gearbox as soon as the defined filling level of the oil reservoir is reached. The oil reservoir may be located inside or outside or partially inside and partially outside the gearbox. Furthermore, the oil reservoir may be designed in one piece with the oil sump of the gearbox or may be designed as a separate component which is fluidly coupled with the oil sump.

Alternatively, the device may include a first valve unit and a second valve unit. The first valve unit may be configured to block the connection between the outlet of the gearbox and the inlet of the gearbox via the first oil circuit, and may be configured to unblock the connection between the outlet and the inlet of the gearbox via the third oil circuit as long as the feeding to the gearbox from the first oil circuit is less than the predefined oil flow rate or the corresponding operational value.

The second valve unit may be configured to block the connection between the outlet of the gearbox and the oil tank via the second oil circuit as long as the feeding to the gearbox from the second oil circuit is less than the predefined oil flow rate or the corresponding operational value.

The first valve unit may comprise a solenoid valve and a 5/2 directional control valve with five connections and two valve positions. The solenoid valve may be configured to apply a feeding pressure in the first oil circuit upstream of the inlet of the gearbox to a control surface of a valve control spool of the 5/2 directional control valve in a first operational state of the solenoid valve.

A control line between the solenoid valve and the 5/2 directional control valve may be fluidly coupled upstream of the 5/2 directional control valve with the scavenge pump by a throttle.

In one embodiment a spring load is applied to a spool of the 5/2 directional control valve in the direction of a first position of the spool in which the outlet of the gearbox is fluidly coupled with the inlet of the gearbox via the third oil circuit and the connection between the outlet and the inlet of the gearbox via the first oil circuit is blocked by the 5/2 directional control valve. The feeding pressure in the first oil circuit could be applied opposed to the spring load to the spool and in the direction of a second position of the spool in such a manner that the spool is moved in the second position by the feeding pressure if the compressive force resulting by the feeding pressure exceeds the spring load. In the second position of the spool the outlet of the gearbox is fluidly coupled with the inlet of the gearbox via the first oil circuit. The outlet and the inlet of the gearbox may be fluidly coupled via the third oil circuit, or the connection therebetween via the third oil circuit may be blocked by the 5/2 directional control valve in the second position of the spool.

The second valve unit may comprise a solenoid valve and a 2/2 directional control valve with two connections to it and two valve positions. The solenoid valve may be configured to apply a feeding pressure in the second oil circuit upstream of the inlet of the gearbox to a control surface of a valve control spool of the 2/2 directional control valve in a first operational state of the solenoid valve.

A control line between the solenoid valve and the 2/2 directional control valve may be fluidly coupled upstream of the 2/2 directional control valve with the scavenge pump by a throttle.

In one embodiment a spring load is applied to a spool of the 2/2 directional control valve in the direction of a first position of the spool in which the connection between the outlet and the inlet of the gearbox via the second oil circuit is blocked by the 2/2 directional control valve. The feeding pressure in the second oil circuit could be applied opposed to the spring load to the spool and in the direction of a second position of the spool in such a manner that the spool is moved in the second position by the feeding pressure if the compressive force resulting by the feeding pressure exceeds the spring load. In the second position of the spool the outlet of the gearbox is fluidly coupled with the inlet of the gearbox via the second oil circuit.

Further, the first oil circuit and the second oil circuit may fluidly be coupled with an inlet of an oil tank as well as with an outlet of the oil tank and are configured to receive oil from the oil tank and to direct the received oil to the gearbox.

The second oil circuit may be configured to direct oil from the oil tank to a turbomachinery. Then, a double use is realised in a simple way.

Oil received from the gearbox can be directly conducted back from the oil reservoir into the gearbox via the third oil circuit and into the tank via the first oil circuit and the second oil circuit. Furthermore, oil will be conducted from the oil reservoir only via the third oil circuit directly to the inlet of the gearbox as long as a filling level of the oil reservoir is less than a defined filling level of the oil reservoir. And oil will be directed via the first oil circuit and via the second oil circuit to the oil tank as soon as the defined filling level of the oil reservoir is reached.

The first valve unit may be configured to block the connection between the outlet of the gearbox and the inlet of the oil tank via the first oil circuit, and may be configured to unblock the connection between the outlet and the gearbox via the third oil circuit as long as the feeding to the gearbox from the first oil circuit is less than the predefined oil flow rate or the corresponding operational value.

The second valve unit may be configured to block the connection between the outlet of the gearbox and the oil tank via the second oil circuit as long as the feeding to the gearbox from the second oil circuit is less than the predefined oil flow rate or the corresponding operational value.

A throttle may be positioned between the inlet of the gearbox and the feeding pump of the second oil circuit.

The heat exchanger and/or the filter and/or the monitoring sensors of the second oil circuit may be arranged between the feeding pump and the throttle.

To protect the journal bearings against the single point failure threat of loss of oil from the system, the tank may incorporate offset outlets to each of the oil circuits. The turbomachinery second oil circuit offtake or outlet may be positioned higher in the tank than offset outlet of the first oil circuit feeding solely to the gearbox. In the event of low oil levels the turbomachinery circuit will generate a low oil pressure warning first without the gearbox circuit having yet been affected. The level of offset can be design such that, under all reasonable rates of oil loss, the pilot has reacted to the warning before the remaining feed to the journal bearings via the first oil circuit is lost/reduced.

The disclosed oil system of the gas turbine engine may utilise a single oil tank with at least three separate circuits. A first circuit will have a feeding and a scavenge pump that deliver the oil, via appropriate conditioning units, filters, coolers etc., to the gears and a proportion of the oil needed by the journal bearings of the gearbox. A second circuit will include a feeding and a scavenge pump to (again via appropriate conditioning units) deliver the remaining oil to the journal bearings and the full flow required by all other users of the turbomachinery circuit, such as bearings, seals, squeeze films etc.

The two feeds to the journal bearings may be via independent transfer methods from the static to rotating elements to ensure no single point of failure but may not be required if an appropriate safety case is generated.

In case that oil is fed during the normal operation mode from the outlet of the gearbox only to the first oil circuit and the second oil circuit the nominal system will split the journal bearing flow 50:50 but the disclosed gas turbine engine is equally applicable to any flow split.

In a further embodiment of the gas turbine engine oil is routed from the outlet of the gearbox to the first oil circuit, to the second oil circuit and to the third oil circuit during the normal operation mode. Then it is possible that the split between the first oil circuit, the second oil circuit and the third oil circuit is for example 40:40:20.

The system may also incorporate a third pump of the third circuit for utilisation during emergency operation mode or during windmilling once the engine is shutdown and if required during the normal operation mode. The gas turbine engine is then equally applicable to any combination of flow splits between the three pumps of the three oil circuits or any other additional pumps.

In the event of any failure type in either circuit the disclosed gas turbine engine will ensure the bearings receive circa 50% of the optimum oil flow. Although overheating will occur, this will be sufficient to minimise any bearing damage and to avoid a hazardous outcome.

Cross linking the scavenge elements of the circuit ensures that oil is removed from the gearbox in case that at least one pump or at least one pump drive fails, and ensures some level of cooling of the oil via the remaining circuit. Thus, the present gas turbine engine guards against a single point failure escalating to a hazardous condition, e. g. a locked fan. Furthermore, the disclosed gas turbine engine guards against needing to circumvent the pilot action with an active control system, which may suffer from spurious activation.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

Embodiments will now be described by way of example only, with reference to the Figures, in which.

Figure 4:
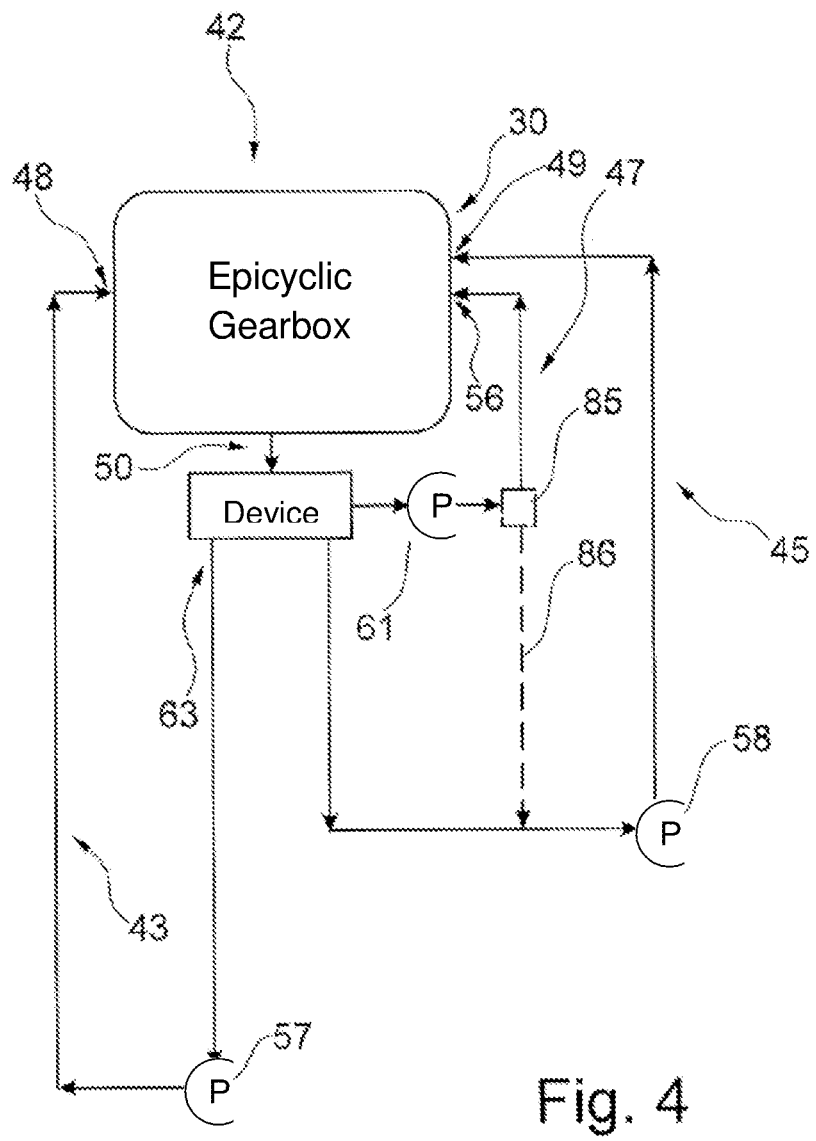
Figure 5:
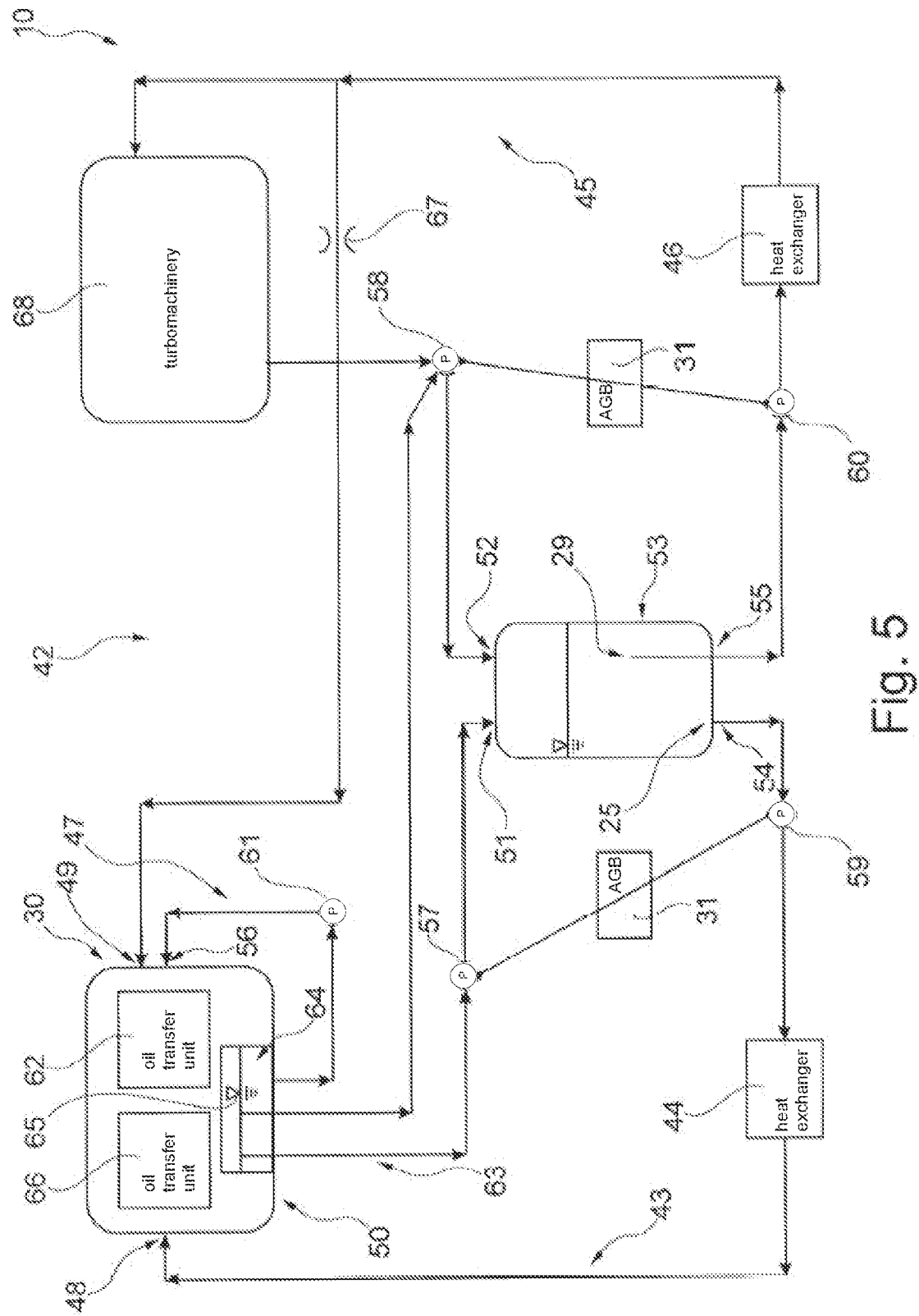

FIG. 4 a first embodiment of an oil system of a gas turbine engine;

FIG. 5 a second embodiment of an oil system of a gas turbine engine; and

Figure 6:
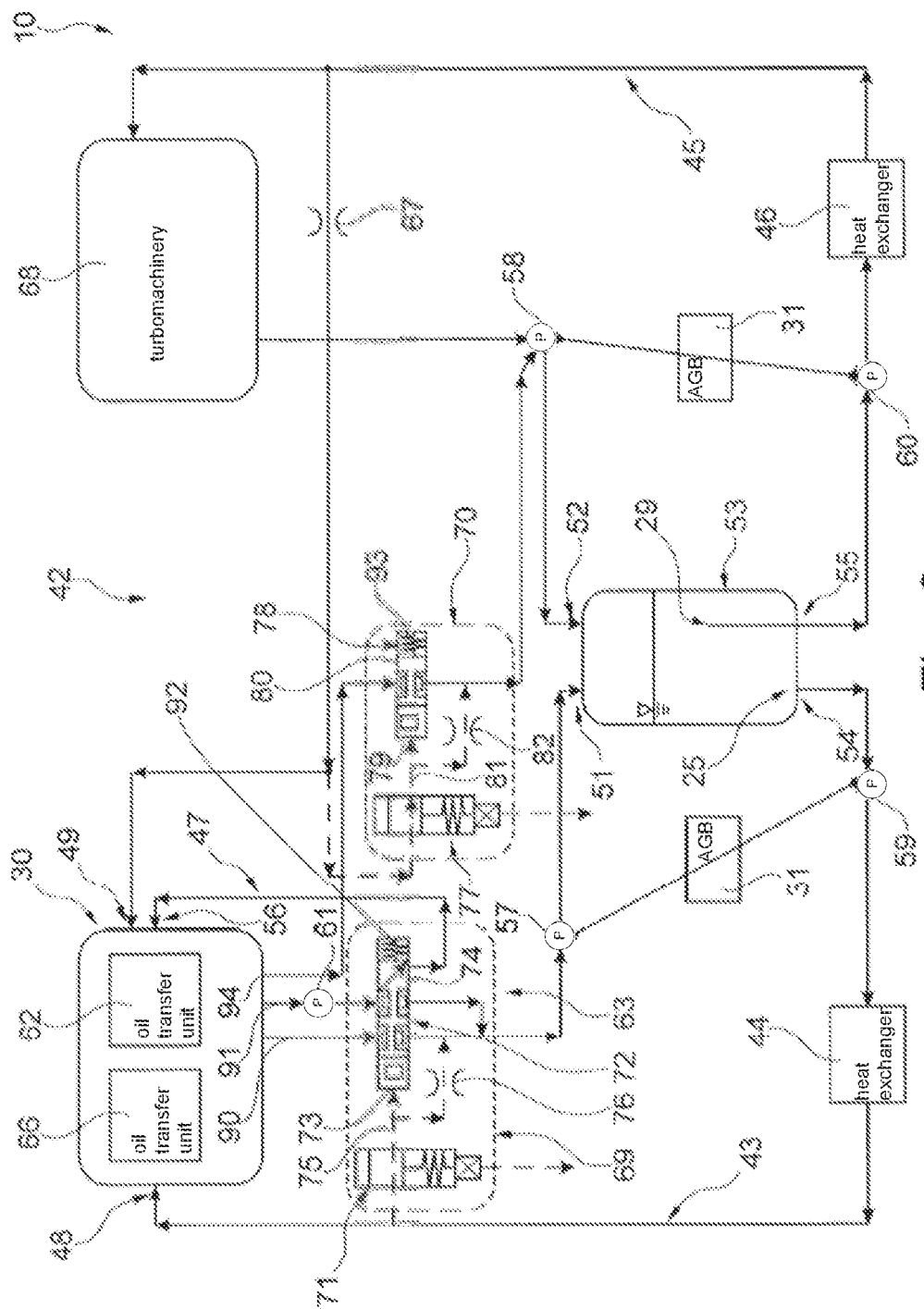

FIG. 6 a third embodiment of an oil system of a gas turbine engine.

Figure 1:
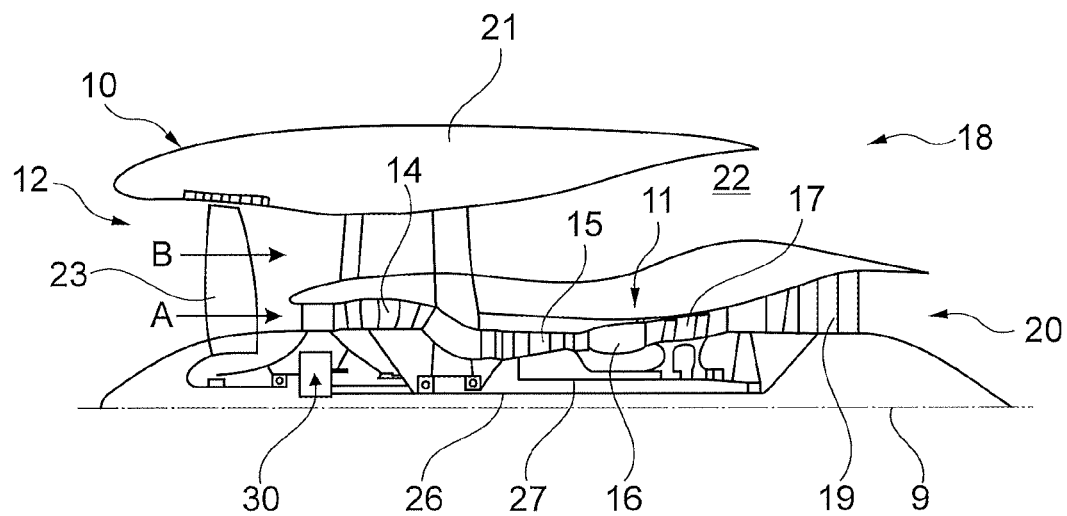
FIG. 1 is a sectional side view of a gas turbine engine.

FIG. 1 illustrates a gas turbine engine 10 having a principal rotational axis 9. The engine 10 comprises an air intake 12 and a propulsive fan 23 that generates two airflows: a core airflow A and a bypass airflow B. The gas turbine engine 10 comprises a core 11 that receives the core airflow A. The engine core 11 comprises, in axial flow series, a low pressure compressor 14, a high-pressure compressor 15, combustion equipment 16, a high-pressure turbine 17, a low pressure turbine 19 and a core exhaust nozzle 20. A nacelle 21 surrounds the gas turbine engine 10 and defines a bypass duct 22 and a bypass exhaust nozzle 18. The bypass airflow B flows through the bypass duct 22. The fan 23 is attached to and driven by the low pressure turbine 19 via a shaft 26 and an epicyclic gearbox 30.

In use, the core airflow A is accelerated and compressed by the low pressure compressor 14 and directed into the high pressure compressor 15 where further compression takes place. The compressed air exhausted from the high pressure compressor 15 is directed into the combustion equipment 16 where it is mixed with fuel and the mixture is combusted. The resultant hot combustion products then expand through, and thereby drive, the high pressure and low pressure turbines 17, 19 before being exhausted through the nozzle 20 to provide some propulsive thrust. The high pressure turbine 17 drives the high pressure compressor 15 by a suitable interconnecting shaft 27. The fan 23 generally provides the majority of the propulsive thrust. The epicyclic gearbox 30 is a reduction gearbox.

Figure 2:
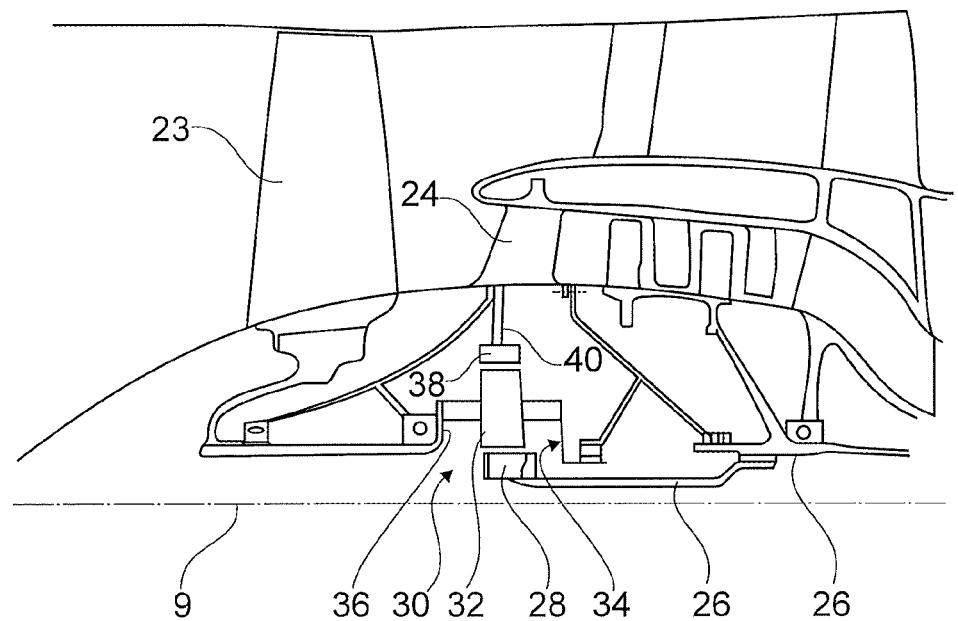
FIG. 2 is a close up sectional side view of an upstream portion of a gas turbine engine.

An exemplary arrangement for a geared fan gas turbine engine 10 is shown in FIG. 2. The low pressure turbine 19 (see FIG. 1) drives the shaft 26, which is coupled to a sun wheel, or sun gear 28 of the epicyclic gear arrangement 30. Radially outwardly of the sun gear 28 and intermeshing therewith is a plurality of planet gears 32 that are coupled together by a planet carrier 34. The planet carrier 34 constrains the planet gears 32 to precess around the sun gear 28 in synchronicity whilst enabling each planet gear 32 to rotate about its own axis. The planet carrier 34 is coupled via linkages 36 to the fan 23 in order to drive its rotation about the engine axis 9. Radially outwardly of the planet gears 32 and intermeshing therewith is an annulus or ring gear 38 that is coupled, via linkages 40, to a stationary supporting structure 24.

Note that the terms "low pressure turbine" and "low pressure compressor" as used herein may be taken to mean the lowest pressure turbine stages and lowest pressure compressor stages (i.e. not including the fan 23) respectively and/or the turbine and compressor stages that are connected together by the interconnecting shaft 26 with the lowest rotational speed in the engine (i.e. not including the gearbox output shaft that drives the fan 23). In some literature, the "low pressure turbine" and "low pressure compressor" referred to herein may alternatively be known as the "intermediate pressure turbine" and "intermediate pressure compressor". Where such alternative nomenclature is used, the fan 23 may be referred to as a first, or lowest pressure, compression stage.

Figure 3:
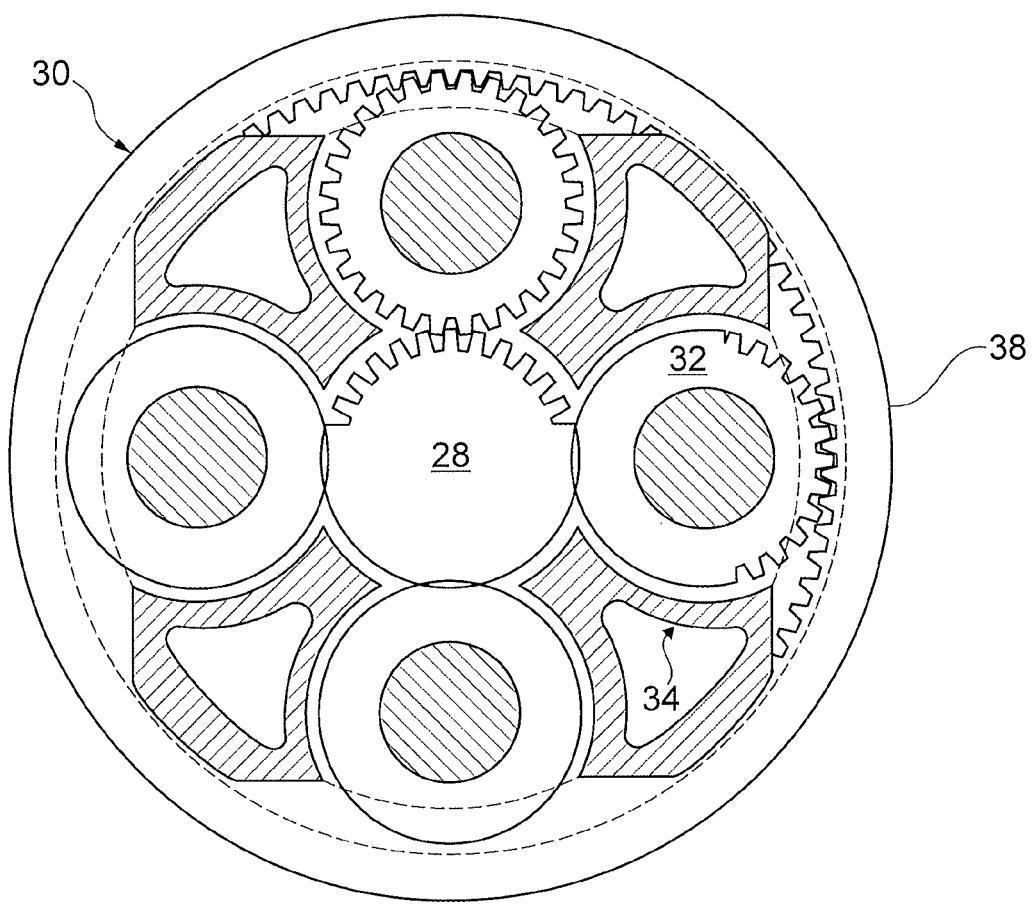
FIG. 3 is a partially cut-away view of a gearbox for a gas turbine engine.

The epicyclic gearbox 30 is shown by way of example in greater detail in FIG. 3. Each of the sun gear 28, planet gears 32 and ring gear 38 comprise teeth about their periphery to intermesh with the other gears. However, for clarity only exemplary portions of the teeth are illustrated in FIG. 3. There are four planet gears 32 illustrated, although it will be apparent to the skilled reader that more or fewer planet gears 32 may be provided within the scope of the claimed invention. Practical applications of a planetary epicyclic gearbox 30 generally comprise at least three planet gears 32.

The epicyclic gearbox 30 illustrated by way of example in FIG. 2 and FIG. 3 is of the planetary type, in that the planet carrier 34 is coupled to an output shaft via linkages 36, with the ring gear 38 fixed. However, any other suitable type of epicyclic gearbox 30 may be used. By way of further example, the epicyclic gearbox 30 may be a star arrangement, in which the planet carrier 34 is held fixed, with the ring (or annulus) gear 38 allowed to rotate. In such an arrangement the fan 23 is driven by the ring gear 38. By way of further alternative example, the gearbox 30 may be a differential gearbox in which the ring gear 38 and the planet carrier 34 are both allowed to rotate.

It will be appreciated that the arrangement shown in FIG. 2 and FIG. 3 is by way of example only, and various alternatives are within the scope of the present disclosure. Purely by way of example, any suitable arrangement may be used for locating the gearbox 30 in the engine 10 and/or for connecting the gearbox 30 to the engine 10. By way of further example, the connections (such as the linkages 36, 40 in the FIG. 2 example) between the gearbox 30 and other parts of the engine 10 (such as the input shaft 26, the output shaft and the fixed structure 24) may have any desired degree of stiffness or flexibility. By way of further example, any suitable arrangement of the bearings between rotating and stationary parts of the engine (for example between the input and output shafts from the gearbox and the fixed structures, such as the gearbox casing) may be used, and the disclosure is not limited to the exemplary arrangement of FIG. 2. For example, where the gearbox 30 has a star arrangement (described above), the skilled person would readily understand that the arrangement of output and support linkages and bearing locations would typically be different to that shown by way of example in FIG. 2.

Accordingly, the present disclosure extends to a gas turbine engine having any arrangement of gearbox styles (for example star or planetary), support structures, input and output shaft arrangement, and bearing locations.

Optionally, the gearbox may drive additional and/or alternative components (e.g. the intermediate pressure compressor and/or a booster compressor).

Other gas turbine engines to which the present disclosure may be applied may have alternative configurations. For example, such engines may have an alternative number of compressors and/or turbines and/or an alternative number of interconnecting shafts. By way of further example, the gas turbine engine shown in FIG. 1 has a split flow nozzle 20, 22 meaning that the flow through the bypass duct 22 has its own nozzle that is separate to and radially outside the core engine nozzle 20. However, this is not limiting, and any aspect of the present disclosure may also apply to engines in which the flow through the bypass duct 22 and the flow through the core 11 are mixed, or combined, before (or upstream of) a single nozzle, which may be referred to as a mixed flow nozzle. One or both nozzles (whether mixed or split flow) may have a fixed or variable area. Whilst the described example relates to a turbofan engine, the disclosure may apply, for example, to any type of gas turbine engine, such as an open rotor (in which the fan stage is not surrounded by a nacelle) or turboprop engine, for example.

The geometry of the gas turbine engine 10, and components thereof, is defined by a conventional axis system, comprising an axial direction (which is aligned with the rotational axis 9), a radial direction (in the bottom-to-top direction in FIG. 1), and a circumferential direction (perpendicular to the page in the FIG. 1 view). The axial, radial and circumferential directions are mutually perpendicular.

FIG. 4 shows a first embodiment of an oil system 42 of the gas turbine engine 10. The oil system 42 comprises a first oil circuit 43, a second oil circuit 45 and at least a third oil circuit 47. The first oil circuit 43, the second oil circuit 45 and the third oil circuit 45 are fluidly coupled with a common outlet 50 of the gearbox 30. Further, the first oil circuit 43, the second oil circuit 45 and the third oil circuit 45 each are fluidly coupled with a separate inlet 48, 49, 56 of the gearbox 30.

The first oil circuit 43 and the second oil circuit 45 each include a pump 57, 58 driven by the core shaft 26 or the core shaft 27. In addition, the third oil circuit 47 includes a pump 61 driven by the fan 23 or the core shaft 27 or any other suitable drive unit, for example an electric drive unit or the like.

The outlet 50 of the gearbox includes a device 63 configured to direct oil from the gearbox 30 to the first oil circuit 43, to the second oil circuit 45 and depending on the respective embodiment of the gas turbine engine 10 to the third oil circuit 47 when the feeding to the gearbox 30 is exceeding a predefined oil flow rate, or is deviating an operational value corresponding with that oil flow rate. Additionally, the device 63 is configured to direct the oil from the gearbox 30 solely to the third oil circuit 47 when the feeding to the gearbox is less than or equal to the predefined flow rate or is less than or equal to at least one corresponding operational value or is greater than or equal to at least one further corresponding operational value.

In case that oil is directed to the third oil circuit 47 by the device 63 over the entire operating range of the gas turbine engine 10 the third oil circuit 47 comprises in a further embodiment a valve unit 85 between the outlet 50 and the inlet 56 of the gearbox 30. The valve unit 85 is configured to direct oil from the outlet 50 to the second oil circuit 45 through an optional duct 86 when the feeding to the gearbox 30 is exceeding the predefined oil flow rate or is deviating the at least one operational value.

FIG. 5 shows a second embodiment of an oil system 42 of the gas turbine engine 10. The oil system 42 comprises a first oil circuit 43 including a heat exchanger 44, a second oil circuit 45 including a heat exchanger 46 and at least a third oil circuit 47. The first oil circuit 43 and the second oil circuit 45 are fluidly coupled with an inlet 48, 49 of the gearbox 30 as well as with an outlet 50 of the gearbox 30. Furthermore, the second oil circuit 45 is configured to direct oil from an oil tank 53 to a turbomachinery 68 of the gas turbine engine 10. The inlet 48 is fluidly coupled with an oil transfer unit 66 which is arranged inside the gearbox 30. In contrast, the inlet 49 is fluidly coupled to a further oil transfer unit 62 of the gearbox 30 which is located inside the gearbox 30. Moreover, the first oil circuit 43 and the second oil circuit 45 are fluidly coupled with an inlet 51, 52 of the oil tank 53 as well as with an outlet 54, 55 of the oil tank 53. The third oil circuit 47 is fluidly coupled with an inlet 56 of the gearbox 30 as well as with the outlet 50 of the gearbox 30.

Further, the first oil circuit 43 and the second oil circuit 45 each include a scavenge pump 57, 58 and a feeding pump 59, 60 driven by the core shaft 26 and accordingly by an auxiliary gearbox 31 of the gas turbine engine 10. In addition, the third oil circuit 47 includes a feeding pump 61 driven by the fan 23.

Moreover, the third oil circuit 47 may comprise an additional oil tank and a scavenge pump between the oil reservoir 64 and the feeding pump 61.

The first oil circuit 43 and the second oil circuit 45 are configured to receive oil from the oil tank 53 and to direct the received oil to the gearbox 30. The third oil circuit 47 is configured to receive oil from the outlet 50 of the gearbox 30 and to direct the received oil to the inlet 49 and the oil transfer unit 62 of the gearbox 30.

The heat exchanger 44 of the first oil circuit 43 is arranged between the feeding pump 59 and the inlet 48 of the gearbox 30. The heat exchanger 46 of the second oil circuit 45 is arranged between the feeding pump 60 and an optional throttle 67 which is positioned between the inlet 49 of the gearbox 30 and the feeding pump 60 of the second oil circuit 45.

The outlet 50 of the gearbox includes a device 63 configured to direct oil from the gearbox 30 to the first oil circuit 43, to the second oil circuit 45 and to the third oil circuit 47 when the feeding to the gearbox 30 is exceeding a predefined oil flow rate, or is deviating an operational value corresponding with that oil flow rate. Additionally, the device 63 is configured to direct the oil from the gearbox 30 to the third oil circuit 47 when the feeding to the gearbox is less than or equal to the predefined flow rate or is less than or equal to at least one corresponding operational value or is greater than or equal to at least one further corresponding operational value.

For this purpose the device 63 includes an oil reservoir 64 from which oil received from the gearbox 30 can be directly conducted back into the gearbox 30 via the third oil circuit 47, and into the oil tank 53 via the first oil circuit 43 and the second oil circuit 45. Oil is conducted from the oil reservoir 64 only via the third oil circuit 47 directly to the inlet 56 of the gearbox 30 as long as a filling level of the oil reservoir 64 is less than the defined filling level 65 of the oil reservoir 64. In addition, oil is directed via the first oil circuit 43 and via the second oil circuit 45 to the oil tank 53 and via the third oil circuit 47 to the inlet 56 as soon as the defined filling level 65 of the oil reservoir 64 is reached.

To protect the journal bearings of the gearbox 30 against the single point failure threat of loss of oil from the oil system 42, the oil tank 53 incorporates offset outlets 25, 29 to each of the oil circuits 43, 45. The turbomachinery circuit 45 offset outlet 29 is positioned higher in the oil tank 53 than the offset outlet 25 of the first circuit 43 feeding solely to the gearbox 30. In the event of low oil levels in the oil tank 53 the turbomachinery circuit 45 will generate a low oil pressure warning or another warning signal first without the first circuit 43 having yet been affected. The level of offset can be designed such that, under all reasonable rates of oil loss, the pilot has reacted to the warning before the first oil circuit 43 feed to the journal bearings is lost or reduced.

A third embodiment of the oil system 42 of the gas turbine engine 30 is shown in FIG. 6. The structure and the function of the oil system 42 according to FIG. 6 corresponds substantially to the structure and the function of the oil system 42 according to FIG. 5. However, the device 63 of the oil system 42 according to FIG. 6 differs from the device 63 of the oil system 42 pursuant to FIG. 5.

The device 63 includes a first valve unit 69 and a second valve unit 70. The first valve 69 unit is configured to block the connection between an outlet 90 of the gearbox and the inlet 51 of the oil tank 53 via the first oil circuit 43, and is configured to unblock the connection between an outlet 91 and the inlet 56 of the gearbox 30 via the third oil circuit 47 as long as the feeding to the gearbox 30 from the first oil circuit 43 is less than the predefined oil flow rate or the corresponding operational pressure value.

The first valve unit 69 comprises a solenoid valve 71 and a 5/2 directional control valve 72. The solenoid valve 71 is configured to apply a feeding pressure in the first oil circuit 43 upstream of the inlet 48 of the gearbox 30 to a control surface 73 of a valve control spool 74 of the 5/2 directional control valve 72 in a first operational state of the solenoid valve 71. The solenoid valve 71 can be switched against a spring load from a second operational state into the first operational state by an appropriate electrical control signal. In the second operational state of the solenoid valve 71 the feeding pressure in the first oil circuit 43 is not applied to the spool 74 of the 5/2 directional control valve 72. A control line 75 between the solenoid valve 71 and the 5/2 directional control valve 72 is fluidly coupled upstream of the 5/2 directional control valve 72 with the scavenge pump 57 by a throttle 76.

A spring load of a spring 92 is applied to the spool 74 of the 5/2 directional control valve 72 in the direction of a first position of the spool 74 in which the outlet 91 of the gearbox 30 is fluidly coupled with the inlet 56 of the gearbox 30 via the third oil circuit 47 and the connection between the outlet 90 and the inlet 51 of the tank 53 via the first oil circuit 43 is blocked by the 5/2 directional control valve 72. The feeding pressure in the first oil circuit 43 could be applied opposed to the spring load to the spool 74 and in the direction of a second position of the spool 74 in such a manner that the spool 74 is moved to the second position by the feeding pressure if the compressive force resulting by the feeding pressure exceeds the spring load. In the second position of the spool 74 the outlet 90 of the gearbox 30 is fluidly coupled with the inlet 51 of the tank 53 via the first oil circuit 43. The outlet 91 of the gearbox 30 is fluidly coupled via the third oil circuit 47 and the 5/2 directional control valve 72 with the inlet 51 of the tank 53 in the second position of the spool 74.

The second valve unit 70 is configured to block the connection between an outlet 94 of the gearbox 30 and the oil tank 53 via the second oil circuit 45 as long as the feeding to the gearbox 30 from the second oil circuit 45 is less than the predefined oil flow rate or is less than or equal to at least one corresponding operational value or is greater than or equal to at least one further corresponding operational value.

For this purpose the second valve unit 70 comprises a solenoid valve 77 and a 2/2 directional control valve 78. The solenoid valve 77 is configured to apply a feeding pressure in the second oil circuit 45 upstream of the inlet 49 of the gearbox 30 to a control surface 79 of a valve control spool 80 of the 2/2 directional control valve 78 in a first operational state of the solenoid valve 77. The solenoid valve 77 can be switched against a spring load from a second operational state into the first operational state by an appropriate electrical control signal. In the second operational state of the solenoid valve 77 the feeding pressure in the second oil circuit 45 is not applied to the spool 80 of the 2/2 directional control valve 78. A control line 81 between the solenoid valve 77 and the 2/2 directional control valve 78 is fluidly coupled upstream of the 2/2 directional control valve 78 with the scavenge pump 58 by an optional throttle 82.

A spring load of a spring 93 is applied to the spool 80 of the 2/2 directional control valve 78 in the direction of a first position of the spool 80 in which the connection between the outlet 94 and the inlet 52 of the tank 53 via the second oil circuit 45 is blocked by the 2/2 directional control valve 78. The feeding pressure in the second oil circuit 45 could be applied opposed to the spring load to the spool 80 and in the direction of a second position of the spool 80 in such a manner that the spool 80 is moved to the second position by the feeding pressure if the compressive force resulting by the feeding pressure exceeds the spring load. In the second position of the spool 80 the outlet 94 of the gearbox 30 is fluidly coupled with the inlet 52 of the gearbox 30 via the second oil circuit 45.

It is also possible that the first oil circuit 43 and the second oil circuit 45 are including separate oil tanks instead of the common oil tank 53. There are also possible solutions where the two pumps 57, 59 and 58, 60 of each oil circuit 43, 45 are connected with a shear neck drive to couple and decouple the two units.

It will be understood that the invention is not limited to the embodiments above-described and various modifications and improvements can be made without departing from the concepts described herein. Except where mutually exclusive, any of the features may be employed separately or in combination with any other features and the disclosure extends to and includes all combinations and sub-combinations of one or more features described herein.

PARTS LIST 9 principal rotational axis
10 engine
11 core
12 air intake
14 low pressure compressor
15 high pressure compressor
16 combustion equipment
17 high-pressure turbine
18 bypass exhaust nozzle
19 low pressure turbine
20 core exhaust nozzle
21 nacelle
22 bypass duct
23 propulsive fan
24 stationary supporting structure
25 offset outlet
26 shaft
27 interconnecting shaft
28 sun gear
29 offset outlet
30 epicyclic gearbox
31 auxiliary gearbox
32 planet gears
34 planet carrier
36 linkage
38 ring gear
40 linkage
42 oil system
43 first oil circuit
44 heat exchanger
45 second oil circuit
46 heat exchanger
47 third oil circuit
48 inlet
49 inlet
50 outlet of the gearbox
51 inlet of the oil tank coupled with the first oil circuit
52 inlet of the oil tank coupled with the second oil circuit
53 oil tank
54 outlet of the oil tank coupled with the first oil circuit
55 outlet of the oil tank coupled with the second oil circuit
56 inlet of the gearbox, coupled to the third oil circuit
57, 58 scavenge pump
59, 60 feeding pump
61 feeding pump
62 oil transfer unit
63 device
64 oil reservoir
65 defined filling level
66 oil transfer unit 67 throttle
68 turbomachinery
69 first valve unit
70 second valve unit
71 solenoid valve
72 5/2 directional control valve
73 control surface
74 valve control spool
75 control line
76 throttle
77 solenoid valve
78 2/2 directional control valve
79 control surface
80 control spool valve
81 control line
82 throttle
85 valve unit
86 duct
90 outlet of the gearbox coupled with the first oil circuit
91 outlet of the gearbox coupled with the third oil circuit
92 spring of the 5/2 directional control valve
93 spring of the 2/2 directional control valve
94 outlet of the gearbox coupled with the second oil circuit
A core airflow
B bypass airflow

The invention claimed is:

1. A gas turbine engine for an aircraft comprising:
an engine core comprising at least one turbine, at least one compressor and at least one shaft connecting the turbine to the compressor;
a fan located upstream of the engine core, the fan comprising a plurality of fan blades;
a gearbox that receives an input from the shaft and outputs drive to the fan so as to drive the fan at a lower rotational speed than the shaft;
a first oil circuit, a second oil circuit and a third oil circuit;
the first oil circuit, the second oil circuit and the third oil circuit fluidly coupled with at least one inlet of the gearbox to provide an oil feed to the gearbox, as well as with at least one outlet of the gearbox;
the first oil circuit and the second oil circuit each including at least one pump driven by the shaft;
the third oil circuit including a pump; and
the at least one outlet of the gearbox including a device configured to direct oil from the gearbox to:
at least one chosen from the first oil circuit, the second oil circuit, and the third oil circuit when an operational value indicates that the oil feed exceeds a predefined oil flow rate, and
the third oil circuit when the operational value indicates that the oil feed is less than or equal to the predefined oil flow rate;
an oil tank;
a turbomachinery;
wherein the second oil circuit is configured to direct oil from the oil tank to the turbomachinery;
the at least one pump of the first oil circuit and the at least one pump of the second oil circuit being driven by the at least one shaft; and
the pump of the third oil circuit being driven by the fan.

2. The gas turbine engine according to claim 1, wherein:
wherein the at least one turbine includes a first turbine, the at least one compressor includes a first compressor, and the at least one shaft includes a first core shaft;
wherein the at least one turbine also includes a second turbine, the at least one compressor also includes a second compressor, and the at least one shaft also includes a second core shaft connecting the second turbine to the second compressor; and
the second turbine, second compressor, and second core shaft are arranged to rotate at a higher rotational speed than the first core shaft.

3. The gas turbine engine according to claim 1, wherein:
the first oil circuit includes a heat exchanger.

4. The gas turbine engine according to claim 1, wherein:
the second oil circuit includes a heat exchanger.

5. The gas turbine engine according to claim 1, wherein:
the first oil circuit and the second oil circuit each include a scavenge pump and a feeding pump driven by the at least one shaft.

6. The gas turbine engine according to claim 2, wherein:
the third oil circuit includes a pump driven by at least one chosen from the first core shaft, the second core shaft, the fan, and a separate drive unit.

7. The gas turbine engine according to claim 1, wherein:
the device includes an oil reservoir from which oil received from the gearbox is directly conducted back into the gearbox via the third oil circuit, and conducted back into a the gearbox via the first oil circuit and the second oil circuit,
whereby oil is conducted from the oil reservoir:
directly back into the gearbox only via the third oil circuit as long as a filling level of the oil reservoir is less than a defined filling level of the oil reservoir,
via the first oil circuit and via the second oil circuit to the oil tank if the filling level meets the defined filling level.

8. The gas turbine engine according to claim 1, wherein:
the device includes a first valve unit and a second valve unit, whereby the first valve unit is configured to block a connection between the at least one outlet of the gearbox and the inlet of the oil tank via the first oil circuit, and is configured to unblock the connection between the at least one outlet of the gearbox and the at least one inlet of the gearbox via the third oil circuit if the operational value indicates that the oil feed from the first oil circuit is less than or equal to the predefined oil flow rate.

9. The gas turbine engine according to claim 8, wherein:
the second valve unit is configured to block the connection between the at least one outlet of the gearbox and the at least one inlet of the gearbox via the second oil circuit if the operational value indicates that the oil feed from the second oil circuit is less than or equal to the predefined oil flow rate.

10. The gas turbine engine according to claim 8, wherein:
the first valve unit includes a solenoid valve and a 5/2 directional control valve, whereby the solenoid valve is configured to apply a feeding pressure into the first oil circuit upstream of the at least one inlet of the gearbox to a control surface of a valve control spool of the 5/2 directional control valve in a first operational state of the solenoid valve.

11. The gas turbine engine according to claim 10, and further comprising:
a control line between the solenoid valve and the 5/2 directional control valve fluidly coupled upstream of the 5/2 directional control valve with a scavenge pump and a throttle.

12. The gas turbine engine according to claim 8, wherein:
the second valve unit includes a solenoid valve and a 2/2 directional control valve, whereby the solenoid valve is configured to apply a feeding pressure into the second oil circuit upstream of the at least one inlet of the gearbox to a control surface of a valve control spool of the 2/2 directional control valve in a first operational state of the solenoid valve.

13. The gas turbine engine according to claim 12, and further comprising:
a control line between the solenoid valve and the 2/2 directional control valve fluidly coupled upstream of the 2/2 directional control valve with a scavenge pump and a throttle.

14. The gas turbine engine according to claim 1, and further comprising:
the oil tank including an inlet and an outlet;
wherein the first oil circuit and the second of circuit are fluidly coupled with the inlet of the oil tank and the cutlet of the of tank, and
the first oil circuit and the second oil circuit are configured to receive oil from the oil tank and to direct the received of to the gearbox.

15. The gas turbine engine according to claim 1, and further comprising:
a throttle positioned between the at least one inlet of the gearbox and the at least one pump of the second oil circuit.

\* \* \* \* \*